F. PARIZEK.
WHISTLE.
APPLICATION FILED FEB. 14, 1919.
1,328,639.
Patented Jan. 20, 1920.
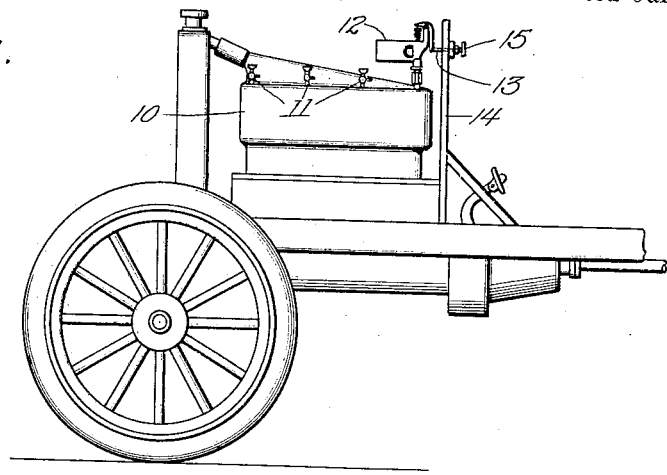
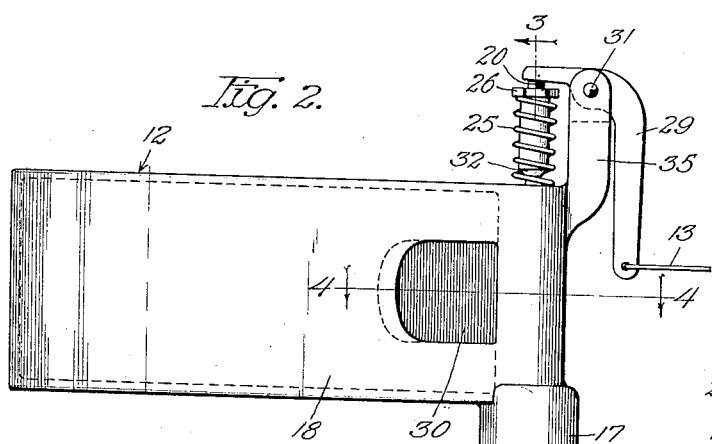
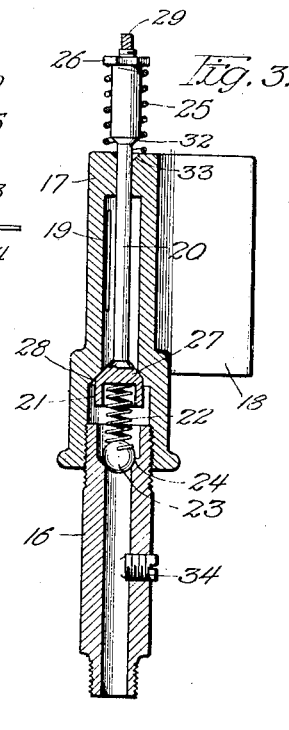
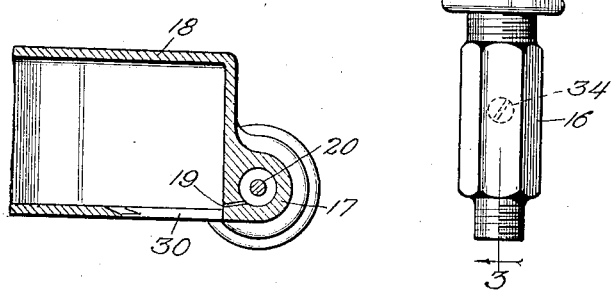
WITNESSES:
Arthur W. Carlson
Robert H. Weir
INVENTOR
Frank Parizek.
BY Gabel & Mueller
ATTORNEYS

UNITED STATES PATENT OFFICE.

FRANK PARIZEK, OF CHICAGO, ILLINOIS.

WHISTLE.

1,328,639. Specification of Letters Patent. Patented Jan. 20, 1920.

Application filed February 14, 1919. Serial No. 276,901.

*To all whom it may concern:*

Be it known that I, FRANK PARIZEK, a citizen of the United States, residing at Chicago, in the county of Cook and State of Illinois, have invented a certain new and useful Improvement in Whistles, of which the following is a full, clear, concise, and exact description, reference being had to the accompanying drawings, forming a part of this specification.

My invention relates to whistles, or alarms or what might be more properly called audible signaling devices. My invention is of particular utility for instance in connection with automobiles although its use is not so limited.

My improved whistle is, however, of such a nature that it can be readily applied to the engine of an automobile so that it can be actuated by air blasts of said engine occasioned by the explosions within the engine cylinders. In one form of the invention I apply it to the opening of an automobile engine which opening is usually supplied with a pet-cock. Suitable provision is then made whereby the whistle is controllable from the dash-board of the automobile to emit signals as may be required. I will describe my invention more in detail by referring to the accompanying drawing in which—

Figure 1 is a fragmentary view of an automobile showing my improved whistle in position;

Fig. 2 is a side view of the whistle;

Fig. 3 is a sectional view on line 3, 3 of Fig. 2, and

Fig. 4 is a fragmentary view on line 4, 4 of Fig. 2.

By referring more particularly to Fig. 1, I show an automobile engine 10 having the usual pet-cocks 11, one of the pet-cocks for the fourth cylinder being replaced by my improved signaling device or whistle 12. A suitable cord 13 leads to the interior of the dash-board 14 where a suitable button 15 may be used to control the signaling operations of the whistle through the agency of the said cord 13.

Referring more particularly to Figs. 2, 3, and 4 which show the device 12 in detail, I provide a nipple 16 threaded at both extremities, the lower threaded extremity being of the proper design to fit into the hole in the engine cylinder usually occupied by a pet-cock or similar device. The upper threaded extremity of the nipple 16 fits directly into a hollow cylindrical stem 17, which is preferably integrally formed or cast with the hollow box like sounding board structure 18. The hollow stem 17 communicates with the interior of the sounding box structure 18 through a wide thin duct 19, as more clearly seen from Figs. 3 and 4. Within the hollow stem 17 I provide a valve spindle 20 having a puppet 21 at its lower extremity which confines one extremity of the coiled spring 22, the other extremity of this spring resting on top of a ball valve 23 which ball valve has the seat 24. The spring normally presses the valve against its seat 24 and acts in the nature of a check valve in a manner presently to be explained. The valve spindle protrudes outwardly of the stem 17 and is encircled at its top portion by a retractile spring 25, which spring acts between the top upper surface of the stem 17 and a nut 26 provided at the extremity of the valve spindle. The valve spindle is shown in its upper position in the figures, in which position this valve spindle closes the passageway upwardly through the nipple 16, through the agency of the valve 27 carried by said valve spindle, which valve 27 is provided with a seat 28. Now whenever an explosion takes place within the engine cylinders an impulse of air is transmitted upwardly through the nipple 16. But this cannot pass unless the valve stem is lowered to open the valve 27. This is done through the agency of the lever 29 which lever is controlled by the cord 13. Whenever this lever is rotated in a contra-clockwise manner through the agency of the finger piece 15, then the valve stem 20 is pressed downwardly, the engine 10 emitting impulses of air or gas which are transmitted upwardly through the nipple 16 and through the duct 19 thereby causing a whistling sound. This sounding board structure is preferably a hollow rectangular device having a whistle mouth or opening 30. As the impulses of air pass through the duct 19 and are blown across the mouth 30 of the sounding board structure the whistle before referred to is caused to give an alarm. The lever 29 is suitably rotatably mounted upon the pin 31. It will be seen that the ball valve 23 acting against the spring 22 permits the gaseous impulses to pass upwardly but prevents passage of air downwardly at those times when the engine is drawing in its mixture prior to the explosion. The valve spindle is provided further with a valve 32 having a seat 33, this valve being closed whenever the valve spindle 20 is pressed downwardly by the lever 29, so as to prevent the escape of gases from the interior of the stem 17 whereby all of the gases are forced through the duct 19. I further provide a means for adjustment consisting of the adjustable stud 34 seated in the nipple 16 and extending inwardly. An adjustment of this stud 34 causes the restriction or enlargement of the duct through which the impulses pass so as to increase or decrease the volume of sound as may be desired. It will be noted that the construction of my invention is of such a character that the sounding board portion 18 together with the stem 17 and together with the lever supporting arm 35 may all be made in one piece thus to facilitate manufacture and to decrease the cost of construction. It will also be seen that the valve spindle carries two valves and is alined with the third valve or check valve, thus making a very simple apparatus.

From what has been described the nature of my invention will be readily clear to those skilled in the art and it will also be seen that this structure is capable of many modifications within the scope of the appended claims.

Having thus, however, described one form which my invention may take what I claim as new and desire to secure by Letters Patent is:

1. A signaling device of the character described comprising a sound box and a valve compartment integral therewith, a nipple attached to the valve compartment and having one of its ends adapted to fit the pet-cock opening of an engine, the valve mechanism in said compartment comprising two oppositely acting valves, and means carried by said valve compartment for operating said valve mechanism, said nipple forming a seat for one of said valves.

2. A signaling device of the character described comprising a sound emitting compartment and valve mechanism, said valve mechanism including a valve casing and valve spindle, means for connecting the valve casing to the compression chamber of an engine, a pair of valves carried by said spindle, and means mounted upon said valve casing for actuating said valve spindle so that when one valve is in its open position the other valve is closed.

3. A signaling device of the character described comprising a sound emitting compartment and valve mechanism, said valve mechanism including a valve casing and valve spindle, a pair of valves carried by said spindle, means for actuating said valve spindle so that when one valve is in its open position the other valve is closed, and a check valve for permitting the passage of gas through said valve casing in one direction only.

4. A signaling device of the character described comprising a sound emitting compartment and valve mechanism, said valve mechanism including a valve casing and valve spindle, a pair of valves carried by said spindle, means for actuating said valve spindle so that when one valve is in its open position the other valve is closed, a check valve for permitting the passage of gas through said valve casing in one direction only, said check valve being alined with said valve spindle, and a spring interposed between said check valve and said valve spindle.

5. A signaling device of the character described comprising a sound emitting compartment and valve mechanism, said valve mechanism including a valve casing and valve spindle, means for connecting the valve casing to the compression chamber of an engine, a pair of valves carried by said spindle, means for actuating said valve spindle so that when one valve is in its open position the other valve is closed, means for preventing air passing through the valve casing in the wrong direction and means for restricting the size of the duct of said valve casing.

6. A signaling device of the character described comprising a sound emitting compartment and valve mechanism, said valve mechanism including a valve casing and valve spindle, a pair of valves carried by said spindle, means for actuating said valve spindle so that when one valve is in its open position to admit air to the valve casing, the other valve is closed, to direct all the air to the sound emitting compartment, a check valve for permitting the passage of gas through said valve casing in one direction only, and means for restricting the size of the duct of said valve casing.

7. A signaling device of the character described comprising a sound emitting compartment and valve mechanism, said valve mechanism including a valve casing with an air passage therethrough and valve spindle in said air passage, a pair of valves carried by said spindle, means for actuating said valve spindle so that when one valve is in its open position the other valve is closed, a check valve for permitting the passage of gas through said valve casing in one direction only, said check valve being alined with said valve spindle, a spring interposed between said check valve and said valve spindle, and a screw adapted to be turned into the air passage for restricting the size of the duct of said valve casing.

In witness whereof I hereunto subscribe my name this 10th day of February, A. D. 1919.

FRANK PARIZEK.